Dec. 11, 1951     E. T. P. NEUBAUER     2,577,798
BEARING CONSTRUCTION WITH SEGMENTAL SHOE ON
FLEXIBLE RESILIENT SUPPORT
Filed May 23, 1947
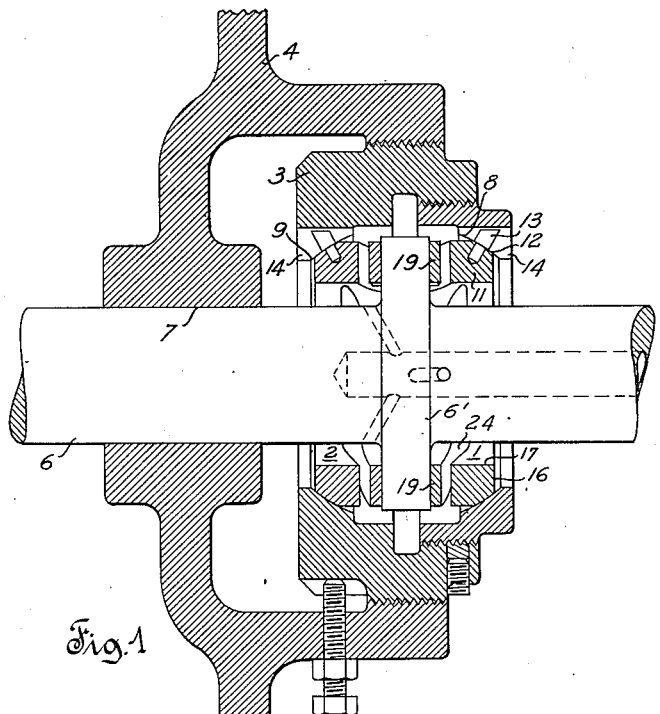
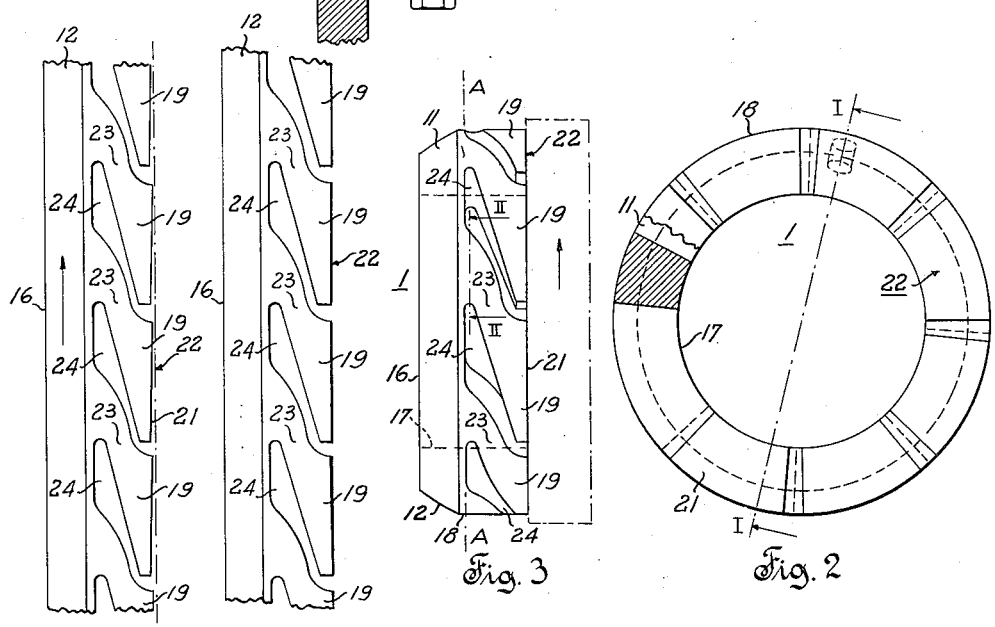
INVENTOR
Emil T. P. Neubauer
BY
William S. Gates
ATTORNEY Patented Dec. 11, 1951

2,577,798

UNITED STATES PATENT OFFICE 2,577,798

BEARING CONSTRUCTION WITH SEGMENTAL SHOES ON FLEXIBLE RESILIENT SUPPORTS

Emil T. P. Neubauer, Milwaukee, Wis., assignor to Allis-Chalmers Manufacturing Company, Milwaukee, Wis., a corporation of Delaware Application May 23, 1947, Serial No. 749,930

8 Claims. (Cl. 308—160)

This invention relates to rotary shaft bearings and more particularly to bearings capable of high unit area loading due to the establishment of a wedge-like oil film under high pressure conditions.

The principles by which bearings of this type are enabled to bear high unit loads are well known and understood, and such bearings ordinarily involve a number of segments or shoes generally arranged to cooperate in forming a generally annular bearing surface, with provision for individual tilting of the various segments to establish the wedge shaped films of lubricant. In some cases, supports for the segments or shoes have been made resilient, and in many cases the supports are, in turn, mounted on a self-aligning rigid base ring seated in a spherical bearing seat in the machine frame. Many of the known support arrangements are, however, complicated and expensive.

The present invention concerns a simple arrangement of the segmental shoes on cantilever shoe supports which extend in a generally circumferential direction in spaced relation to the base ring or stationary frame. The cantilever supports may be integral with both the shoes and the base ring, and are made sufficiently flexible in the direction of the load thrust to permit some slight resilient yielding or cushioning of the shoe in the direction of the thrust in addition to a tilting of the shoe in the direction of the leading edge, to allow for the desired wedge shaped oil film.

An object of the invention concerns the provision of a simple compact bearing unit of inexpensive construction capable of withstanding high unit loads and providing for yielding, with attendant tilting, through support flexure.

A practical embodiment of the invention having the above mentioned characteristics and advantages is illustrated in the accompanying drawing which forms a part of this specification, in which like reference characters indicate corresponding parts throughout the several views, and in which:

Fig. 1 is a view in section on an axial plane indicated by line I—I of Fig. 2 through a bearing having thrust bearing elements embodying the present invention;

Fig. 2 is a detail end view of one of the thrust bearing elements of Fig. 1, shown partially broken away and in section on the line II—II of Fig. 3;

Fig. 3 is a side view of the thrust bearing unit of Fig. 2.;

Fig. 4 is a partial development of the periphery of the unit shown in Fig. 3;

Fig. 5 is a view similar to Fig. 4 but with an exaggerated distortion to illustrate an operational condition.

As illustrated in the drawing, bearing elements 1 and 2 according to the invention are mounted in a thrust housing 3 of conventional construction, held in a machine frame 4 in which a rotary shaft 6 is journaled as at 7. Bearing units 1 and 2 face oppositely and are retained in self-aligning relation by spherical seats 8 and 9 respectively.

Elements 1 and 2 are arranged to take axial thrust in opposite directions transmitted by shaft collar or flange 6', and are made symmetrical to a plane midway between their bearing surfaces when in coaxial opposed relation as shown. Accordingly, only of these elements will be described in detail, it being understod that the other is reversed as to designed relative direction of rotation.

Bearing element 1 comprises a base ring portion 11 which may be considered as an annular solid having a convex spherical zone surface 12 which serves to engage a seat (as 8) of a machine frame in non-rotatable self-aligning relation. Rotation relative to the seat 8 in the arrangement shown, is prevented as by a stud 13 engaging a slot 14 in the seat 8. This base ring portion 11 may be considered as bounded by an end surface 16, an inner peripheral surface 17, an outer peripheral surface 18, and an imaginary plane perpendicular to the axis of revolution, such as that of line A—A in Fig. 3.

On the base ring portion 11 are mounted a plurality (eight shown) of segmental bearing shoe portions 19 each having a segmental thrust bearing surface 21. These shoe portions or shoes 19 are so mounted, as described below, that their bearing surfaces 21 normally lie in a common plane or otherwise form a segmented annular bearing surface 22.

The term annular surface is taken herein as defining any ring-shaped surface or zone of a surface of revolution, ranging from a true geometrical annulus (the plane surface lying between two concentric circles), to a zone of a spherical, cylindrical, conical or complex surface; that is, any surface of revolution lying between two parallel planes perpendicular to the axis of revolution.

In the illustrated embodiment the shoes 19 are preferably integrally connected with base ring portion 11, by means of being formed as cantilever projections on the base ring, extending in the direction of surface 22, and having intermediate shoe support portions 23 extending circumferentially of the ring portion 11, in spaced relation to the base ring portion. It will be seen that the portion 23 may be made sufficiently thin (in dimension normal to surface 22, or transverse to its mean longitudinal axis) that it will be relatively flexible and resilient, compared with the solid ring portion; and it will also be seen that on any straight line normal to a surface 21 and extending between any point of that surface and ring portion 11, the surface is nowhere backed up or supported by a solid column of material in compression. Pressure on surface 21 will accordingly cause yielding of the whole shoe 19 in the direction of ring portion 11, owing to flexing of the projection, notably as at shoe support portion 23. This flexing of the projection will cause yielding and tilting of the shoes as illustrated in exaggerated form in Fig. 5 and will promote maintenance of a wedge-shaped oil film between the surfaces 21 and the engaged surface of thrust flange 6'. The material, form and dimensions of portion 23 and shoe 19 can be so chosen as to obtain such resilient flexing, under predetermined loading and operating conditions, as to give precisely the desired yield and tilt. For example, the width of the projection portion 23 and shoe 19 parallel to a generating element of surface 22 will be made substantially greater than the thickness of portion 23 to resist undesired tilting by torsion or lateral flexing.

As a whole, the bearing element can be described as an annular solid with an annular bearing surface 22 divided and undercut by a series of angularly spaced voids 24 of such form as to leave the shoe portions 19 individually connected with base ring portion 11 only by relatively flexible, resilient, cantilever, shoe support portions 23 extending circumferentially in spaced relation to the base ring portion. These voids 24 may be considered as extending clear through the ring in a direction generally parallel to the generating elements of the bearing surface 22, and as extending only from this surface 22 to the imaginary surface of base ring portion 11 (plane of line A—A, Fig. 3), or only a portion of the depth of the ring normally to the bearing surface 22.

Where, as illustrated, the bearing surface 22 is a planar, axial thrust bearing surface, the shoe supports 23 and bearing surfaces 21 are spaced from the base ring portion in an axial direction; and the shoe support portions 23 are all arranged to extend in the same direction of rotation circumferentially of the base ring portion, in a helical sense, that is, in the direction of relative rotation of the element with respect to the engaged rotary bearing surface.

Operation of the thrust ring element of the invention is self-evident from the illustration, when considered in the light of the well known "Kingsbury" principle (see Kingsbury 947,242; 1,102,276 and Fulpius 1,735,315). Yielding due to pressure will clearly be greater at the leading or toe ends of the shoes 19, the tilt effect permitting ready entrance of oil to form the well known wedge film. Slight general yielding of all points of the shoes 19 in a common direction normal to the surface, will give a highly desirable cushioning effect to the bearing element of the present invention.

The principles of present invention will facilitate the achievement of compactness and simplicity of design, and low manufacturing cost in bearing elements. Such bearing elements as are illustrated may, for example, be cast in one piece to substantially finished form and dimensions by well known precision casting methods. Choice of material, exact form, and dimensions of the shoe projections, to get the desired yield and tilt, may be readily determined by ordinary design procedures known to persons skilled in the art to which this invention appertains. And very little machine work will be required to finish the working surfaces of a precision-cast element.

It will be understood that the practical embodiment illustrated and described in detail is by way of example, and that the invention includes such modifications and equivalents as may readily occur to persons skilled in the art, within the scope of the appended claims.

It is claimed and desired to secure by Letters Patent:

1. In a bearing element, a substantially rigid base ring portion, a plurality of bearing shoe portions having respective bearing surfaces adapted to form a segmented annular bearing surface, a plurality of cantilever support portions each connected at one end to said base ring and at the other end to one of said shoe portions, each of said support portions extending in a generally circumferential direction from and in axially bodily spaced relation to said base ring, each of said bearing surfaces being circumferentially spaced respectively from said connection between its cantilever support portion and said base ring, and each of said support portions being sufficiently flexible and resilient so that the axial thrust load to be accommodated causes deflection of said bearing surfaces.

2. In a bearing element, a substantially rigid base ring portion, a plurality of bearing shoe portions having respective bearing surfaces adapted to form a segmented annular bearing surface, a plurality of relatively flexible resilient cantilever support portions each connected at one end to said base ring and at the other end to one of said shoe portions, each of said support portions extending in a generally circumferential direction from and in axially bodily spaced relation to said base ring, each of said bearing surfaces being circumferentially spaced respectively from said connection between its cantilever support portion and said base ring, and all of said bearing surfaces normally being in one plane normal to the axis of said base ring when unloaded axially.

3. In a bearing element, a substantially rigid base ring portion, a plurality of bearing shoe portions having respective bearing surfaces adapted to form a segmented annular bearing surface, a plurality of relatively flexible resilient cantilever support portions each connected at one end to said base ring and at the other end to one of said shoe portions, each of said support portions extending in a generally circumferential direction from and in axially bodily spaced relation to said base ring, each of said bearing surfaces being circumferentially spaced respectively from said connection between its cantilever support portion and said base ring, all of said bearing surfaces normally being in one plane normal to the axis of said base ring when unloaded axially, and each of said support portions being sufficiently flexible and resilient so that the axial thrust load to be accommodated causes deflection of said bearing surfaces.

4. An integral bearing element comprising a substantially rigid base ring adapted for transfer of thrust to a machine frame, a plurality of cantilever shoe supporting projections each connected at one end to said base ring and having a relatively flexible resilient portion extending circumferentially of said base ring in axially bodily spaced relation thereto, and a segmented annular bearing surface formed on shoe portions individually connected with said ring by said projections, each segment of said bearing surface respectively occupying a position circumferentially spaced from said connection between its cantilever supporting projection and said base ring, and each of said support portions being sufficiently flexible and resilient so that the axial load to be accommodated causes deflection of each segment of said bearing surface.

5. An integral thrust bearing ring comprising, a segmented annular thrust bearing surface, a substantially rigid annular base portion, said thrust bearing surface being formed on the ends of integral shoe projections, each said shoe projection having a circumferentially extending portion adjacent its junction with said annular base portion in axially bodily spaced relation with said base portion, each segment of said bearing surface occupying a position circumferentially spaced from said junction, and each of said circumferentially extending portions being sufficiently flexible and resilient so that the axial load to be accommodated causes deflection of each segment of said bearing surface.

6. A thrust bearing assembly having in combination: shaft means; collar means associated with said shaft; annular thrust bearing elements mounted coaxially of said shaft means in opposed relation for respective transfer of thrust from said collar means to a machine frame in either axial direction; each of said bearing elements comprising, a substantially rigid base ring portion, a plurality of bearing shoe portions having respective bearing surfaces adapted to form a segmented annular bearing surface for cooperation with said collar means, a plurality of relatively flexible resilient cantilever support portions each connected at one end to said base ring and at the other end to one of said shoe portions, each of said support portions extending in a generally circumferential direction from and in axially bodily spaced relation to said base ring, each of said bearing surfaces being circumferentially spaced respectively from said connection between its cantilever support portion and said base ring in an opposite direction from the intended rotational direction of said shaft, and each of said support portions being sufficiently flexible and resilient so that the axial thrust load to be accommodated causes deflection of said bearing surfaces.

7. An integral bearing element having a substantially rigid base portion, a plurality of relatively flexible bearing shoe projections on said base ring portion terminating in segmental thrust bearing surfaces spaced normally from said base ring portion, said projections being so formed that no continuous column of the material extends in a direction normal to said bearing surface between any point of said bearing surface and said base ring portion, said bearing shoe projections being sufficiently flexible so that the axial thrust load to be accommodated causes deflection of said segmental bearing surfaces.

8. An integral bearing ring having a plurality of segmental bearing surfaces forming a segmented annular bearing surface, said ring having a substantially rigid base portion and being recessed between said segmental bearing surfaces and said base portion so that the portions of said ring on which said segmental bearing surfaces are formed are completely undercut and are connected with said base portions solely by circumferentially extending flexible cantilever support portions, said support portions being sufficiently flexible so that the axial thrust load to be accommodated causes deflection of said segmental bearing surfaces.

EMIL T. P. NEUBAUER.

REFERENCES CITED

The following references are of record in the file of this patent:

UNITED STATES PATENTS

| Number | Name | Date |
|---|---|---|
| 1,688,519 | Bohn | Oct. 23, 1928 |
| 1,991,461 | Howarth | Feb. 19, 1935 |
| 2,424,028 | Haeberlein | July 15, 1947 |

FOREIGN PATENTS

| Number | Country | Date |
|---|---|---|
| 125,510 | Great Britain | Apr. 17, 1919 |
| 405,511 | Germany | Nov. 20, 1924 |